Jan. 18, 1949.   W. W. HALLINAN   2,459,318
FILTER
Filed June 10, 1946   2 Sheets-Sheet 1

Inventor,
William W. Hallinan
By: Robert H. Wendt
Att'y.

Jan. 18, 1949.  W. W. HALLINAN  2,459,318
FILTER

Filed June 10, 1946  2 Sheets-Sheet 2

Inventor,
William W. Hallinan
By: Robert H. Wendt
Atty.

Patented Jan. 18, 1949

2,459,318

UNITED STATES PATENT OFFICE 2,459,318

FILTER

William W. Hallinan, Racine, Wis.

Application June 10, 1946, Serial No. 675,765

6 Claims. (Cl. 210—120)

The present invention relates to filters and is particularly concerned with an improved commercial form of the filter covered by my prior Patent No. 2,389,431, issued November 20, 1945 for filters. This application is a continuation-in-part of my application for Filters, Serial No. 663,360, filed April 19, 1946.

While the present filter units are capable of general application and may be used for many different purposes, they are preferably made of such size and structure that they may be employed in oil burner systems for filtering the fuel oil preliminary to its use in burners of the nozzle or other types.

One of the objects of the invention is the provision of an improved filter unit for oil burners and other purposes, which is adapted to separate from liquids such as fuel oil, substantially all solid residue and fine matter in suspension so that there will be no tendency of the nozzle of the oil burners to become fouled with small solid particles or gummy materials.

Another object of the invention is to provide a more efficient oil filter than the devices which have been employed heretofore in oil burner systems, having a greater filtering area and adapted to provide efficient filtering action with a minimum pressure differential between the inlet and outlet of the filtering housing.

Another object of the invention is the provision of an improved filter which not only removes all solids and gummy matter from the liquid to be filtered, but which also removes all fuzz and fine fibrous or flocculent material, thus providing a substantially clear filtrate.

Another object of the invention is the provision of an improved filter unit which is so constructed that in an emergency a service man may provide an emergency filter by improvising a few filter elements out of fabric or the like until he has had an opportunity to secure the filter elements which may be used as replacements.

Another object of the invention is the provision of an improved filter unit of the fibrous type which may be constructed at a low cost, and thrown away when dirty so that the filter may be kept in a clean and efficient condition at all times at a minimum expense.

Another object of the invention is the provision of an improved filter assembly which is provided with a safety bypass of such character that when the filter elements have become so clogged with residue that they will not pass liquid, the filter itself may be lifted from its seat to bypass the oil and to continue essential operation of the device utilizing the liquid which is being filtered.

Another object of the invention is the provision of an improved filter which requires a minimum number of parts, which is adjustable as to the pressure that may be applied to it, which may be manufactured with a minimum number of machining operations, which is sturdy, efficient, economical and adapted to be used a long period of time without replacement, except clean filter pads that make up the filter assembly.

Other objects and advantages of the invention will be apparent from the following description and the accompanying drawings in which similar characters of reference indicate similar parts throughout the several views.

Referring to the sheets of drawings, of which there are two,

Figure 1:
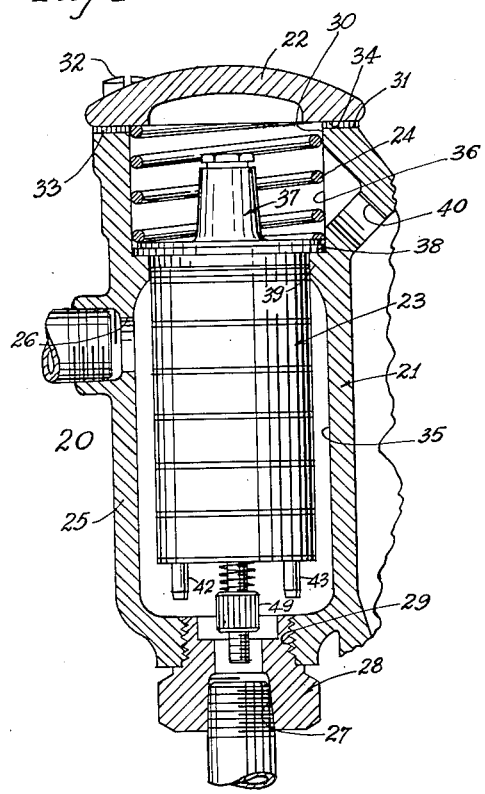
Fig. 1 is a side elevational view of a filter unit shown in connection with a housing, the housing being in section along a plane passing through its axis.

Referring to Fig. 1, 20 indicates in its entirety the complete filter assembly comprising a filter housing 21, cover 22, filter unit 23 and spring 24. The housing which may be employed with the present filter unit is preferably of the type comprising one chamber of a combined straining pump and pressure regulating fuel unit.

In other embodiments of the invention the housing may be a separate one of similar structure and of suitable size as illustrated. Such a housing comprises a substantially cylindrical cast metal member, the cylindrical wall being indicated at 25. It may be provided with a side inlet opening 26 or a bottom inlet opening 27, or either one of these openings may be utilized for pressure gauges or other equipment.

The bottom opening 27 is preferably arranged in a clean-out plug 28 which is threaded into a threaded bore 29 located in the bottom of the housing so that sediment may be removed from the housing by removing the clean-out plug 28. The upper end of the housing may have a circular opening 30 surrounded by a flat seat 31 for the cover 22, which is secured by means of a plurality of screw bolts 32 with a suitable gasket such as a cork gasket 33 interposed between the cover and housing for a liquid tight closure.

The cover 22 may also be a cast metal member having a relatively wide seating surface 34 on its lower side for engaging the housing seat 31, and also leaving a sufficient portion of the cover seat to engage the spring 24 inside the housing.

The housing 21 is preferably formed with a pair of chambers such as the lower elongated chamber 35 of cylindrical shape for the filter pads and the upper cylindrical chamber 36 of slightly greater diameter for receiving spring 24 and the filter pad supporting member 37, which rests upon an annular shoulder 38 formed on an inwardly extending annular rib 39.

An outlet 40 is provided at one side of the upper chamber 36 through which the filtered liquid passes to other parts of the fuel unit, such as the pump. The spring 24 comprises a loosely coiled helical spring of resilient material such as steel or spring bronze. It is of sufficient size to have a sliding fit in the upper chamber 36, engaging the cover 22 at one end and the pad supporting member 37 at its other end to hold this pad supporting member against the annular seat 38.

The filter unit 23 may be of any of the types shown in Figs. 1 and 2, 9 or 10. The filter unit of Fig. 2 comprises the pad supporting member 37, a plurality of filter pads or elements 41 arranged in a stack and impaled upon the pins 42, 43 of a top plate 44. Additional elements of the assembly are the pressure applying rod 45, the rigid pad aligning plates 46, end plate 47, spring 48 and threaded member 49.

Figure 6:
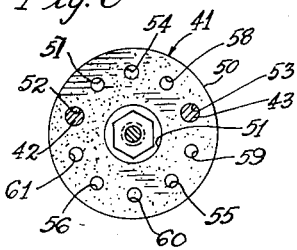
Fig. 6 is a horizontal sectional view taken on the plane of the line 6—6 of Fig. 2 looking in the direction of the arrows showing a top plan view of one of the filter pads with the supporting rod and alignment pin in cross section.
Figure 7:
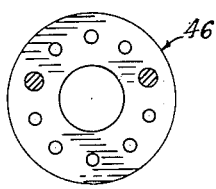
Fig. 7 is a horizontal sectional view taken on the plane of the line 7—7 of Fig. 2 looking in the direction of the arrows showing a plan view of one of the alignment plates.

The filter elements or pads which form the filter unit 23 are shown in plan in Fig. 6 in side elevation in Fig. 1. Each pad consists of a relatively thick cylindrical pad of felt, such as cotton felt, wool felt or some other suitable fibrous material provided with the outer cylindrical edge 50, the inner cylindrical bore 51 and a plurality of through apertures for the following purposes:

Apertures 52 and 53 are for receiving the alignment pins 42 and 43, which are shown in these apertures in section in Fig. 6. Apertures 54, 55 and 56 are filtrate apertures in free communication with the outlet 40 through suitable conduits that pass through the top plate 44, as will be described in detail.

Apertures 57, 58, 59, 60 and 61 are used to receive the liquid that is to be filtered, and the walls of these apertures constitute filtering surfaces which are in communication through the bottom plate 47 with the chamber 35 around the filter unit 23.

All of these apertures in the filter pad may be formed by punching, and the pad itself may be cut out by means of a die, thus providing a very cheap replaceable element for the filter assembly.

Figure 8:
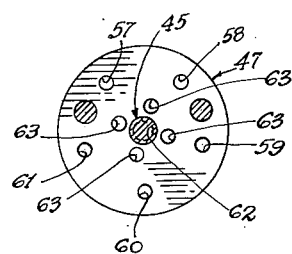
Fig. 8 is a horizontal sectional view taken on the plane of the line 8—8 of Fig. 2 looking in the direction of the arrows showing a plan view of the bottom plate, which also blocks off certain apertures and communicates with others.

Referring to Fig. 8, this shows a top plan view of a bottom plate 47, and this bottom plate is preferably of the same size diameter as the filter disks, and it may be constructed of any rigid material such as thin sheets of iron or tough fibre such as indurated fibre.

The bottom plate 47 is provided with a centrally located aperture 62 for passing the pressure rod 45, shown in section in Fig. 8. Bottom plate 47 also has a plurality of apertures 63 arranged close to its center to permit the liquid to be filtered to have access to the large bore 51 in the filter pads, while still providing sufficient material around the rod 45 to be engaged by the spring 48.

Bottom plate 47 also has all of the other apertures except the filtrate apertures 54, 55 and 56 of Fig. 6, and the bottom plate apertures are, of course, located to register with corresponding apertures in the filter pads, thus bottom plate 47 blocks off the three filtrate apertures 54, 55, 56 at the bottom and liquid has access to these filtrate apertures only after it has passed through parts of a filter pad being filtered during its passage.

The pad aligning plates 46, of which there is one between each pair of pads, may all be identical in construction and they are provided with the same apertures and are of the same size as the apertures described with respect to a filter pad in Fig. 6.

Figures 9, 10, 12:
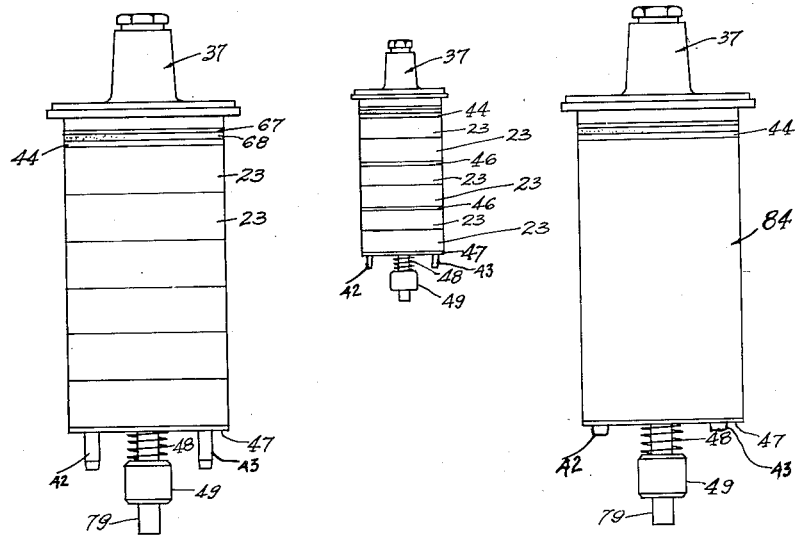
Fig. 9 is a side elevational view of another filter unit assembly which is similar in construction to that shown in Figs. 1 and 2 except that the alignment plates have been eliminated.
Fig. 10 is a view similar to Fig. 9 showing another modification in which the filter element consists of a single pad of fibrous material located between the end plates, which determine the passages into which liquid flows and the passages from which the filtrate flows.
Fig. 12 is a view similar to Fig. 9 showing a modification of the filter unit in which two pads are interposed between each pair of alignment plates.

In some embodiments of the invention these alignment plates may be eliminated. They engage the upper and the lower surface of each pad of felt and by friction keep the pad aligned with the rigid plates 46, which in turn are more accurately aligned with each other by means of the pins 42, 43 than can be accomplished when the pins alone are used for alignment, as illustrated in Fig. 9.

Plates 46 accomplish no filtering action and may be made of metal such as iron or of a stiff fibre board such as indurated fibre. The top plate 44 comprises a rigid metal disk of the same size and shape as the felt pads 41. The top plate is provided with a centrally located aperture 64 for passing the pressure rod 45, with reduced apertures 65, 66 for receiving reduced cylindrical portions of the alignment pins 42, 43 which are riveted or staked to secure them in the top plate 44.

Top plate 44 also has the filtrate apertures 54, 55, 56, but all of the other apertures such as the center bore 51 and the filtering apertures 57—61 are blocked off by the top plate 44. Thus apertures which are open at the bottom of the filter unit are blocked off above and apertures which are open at the top of the filtering unit are blocked off below.

The pad aligning and supporting member 44 comprises the top plate 44 and the two pins 42 and 43, and a plurality of felt pads 41 and alignment plates 46 may be placed alternately one after the other on the pins 42, 43 to form a filter unit that is removable from the housing 21 and replaceable.

In order to prevent fuzz or other fine material from the felt pads 41 from passing into the filtrate, the assembly preferably includes a filter cloth indicated at 67 which may also be of circular shape and of the same size as the pads and plates. Filter cloth 67 may consist of a disk of closely woven fibre impregnated with Bakelite varnish in such manner that the holes between the fibres are still open, the varnish being insoluble in fuel oil.

Figure 2:
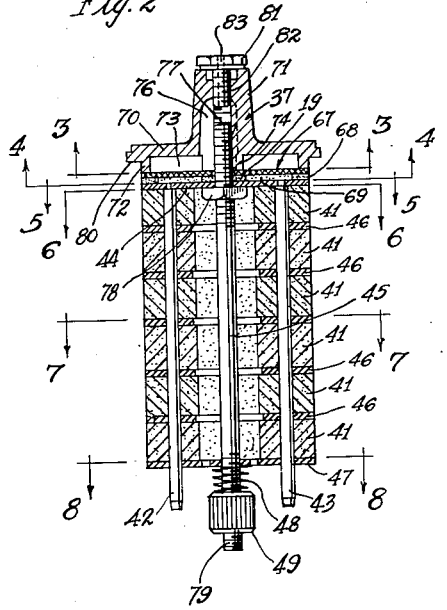
Fig. 2 is a longitudinal sectional view of the filter unit taken on a plane passing through its axis with the supporting rod and alignment pins in elevation.

In other embodiments of the invention a closely woven canton flannel may be used, the fuzzy side being disposed downward in Fig. 2. The filter cloth 67 preferably has an annular gasket 68 comprising a ring of cork or the like, secured by shellac to the filter cloth. This provides a tighter joint between the filter unit and its supporting member 37, and also provides a conduit space 69 between filter cloth 67 and top plate 44.

Filter cloth 67 has the centrally located aperture 64 for passing the pressure rod 45. A second annular gasket 19 surrounds the rod 45 above top plate 44 and is shellacked to the filter cloth 67 surrounding the aperture in this filter cloth. This provides a tight seal about the rod as this small gasket is engaged by the end of lug 74.

It should be noted that the filter cloth 67 has very fine mesh for the purpose of catching all fuzz and small particles that might pass the pads 41. The pad supporting member 37 may comprise a small metal member such as a die casting consisting of a circular body or disk 70 having an axially extending lug 71 on its upper side. Lug 71 is slightly tapered to facilitate its removal from a die.

The circular body 70 of this supporting member 37 has a depending cylindrical rib 72, the lower edge of which (Fig. 2) engages the filter unit at the top surface of the filter cloth 67 thus filter cloth 67 and gasket 68 may be gripped or clamped between rib 72 and top plate 44.

The cylindrical flange 72 forms an annular chamber 73 above the filter cloth 67 and below the body 70. This chamber is annular because there is a central downwardly projecting lug 74 of cylindrical shape inside the center of the chamber 73, this lug being substantially as long axially as the flange 72.

Figure 3:
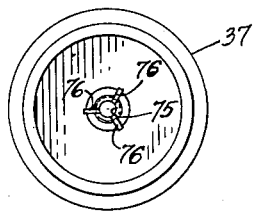
Fig. 3 is a bottom plan view of the pad supporting partition taken on the plane 3—3 of Fig. 2 looking in the direction of the arrows.
Figure 4:
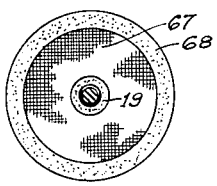
Fig. 4 is a bottom plan view of the filter cloth, which is preferably included for the purpose of removing all fuzz or similar material which might detach itself from felt pads, from the liquid being filtered, taken on the plane of the line 4—4 of Fig. 2 looking in the direction of the arrows.
Figure 5:
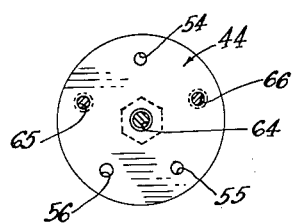
Fig. 5 is a horizontal sectional view taken on the plane of the line 5—5 of Fig. 2 looking downwardly in the direction of the arrows showing the structure of the top plate which blocks certain passages.

Lug 74 on the bottom of supporting member 37, body 70 and upper lug 71 are all provided with a through-bore 75 (Fig. 3) which is threaded to receive the threaded upper end of the pressure rod 45.

In order to provide a conduit leading from the annular space 73 to the upper end of bore 75, lower lug 74 and body 70 and a part of upper lug 71 are provided with slots 76 preferably regularly spaced, extending radially and axially to a point well above the upper end 77 of pressure rod 45. Thus the slots 76, one of which is seen open in Fig. 2, provide communication between the upper end of the bore 75 and the filtrate chamber 73.

The pressure rod 45 serves to secure the top plate 44 to the supporting member 37 and is provided with a nut 78 engaging the lower side of the top plate 44 and clamping gasket 68, and filter cloth 67 between flange 72 and top plate 44. Thus the complete filter unit may be removed by unscrewing the rod 45 at its upper end to take it out of the bore 75, and the pads and plates will be carried by the pins 42, 43 on plate 44.

At its lower end rod 45 preferably has a helical coil spring 48 which engages the bottom plate 47 and is itself engaged by the knurled cylindrical nut 49 located on the threaded end 79 of the rod 45.

The spring 48 is relatively light, but is of sufficient strength to keep the pads and plates in close engagement with each other. The pads may become compressed when subjected to certain pressures, but upon release of the pressure they expand again, and in any event the spring 48 follows up the pads and keeps them engaging each other or engaging the intervening plates so that liquid cannot pass between the plates and pads. The spring prevents formation of cracks that would bypass dirty liquid.

The cylindrical flange 72 on supporting member 37 fits inside the annular rib 39 in the housing 21, while the projecting portion of the body 70 having a lower seating surface 80 rests upon the annular flange 38 where it is held by spring 24 engaged by cover 22.

In order to further throttle the flow of liquid through the filter the upper end of the bore 75 in the supporting member 37 may be provided with a nut 81 carrying a threaded sleeve 82, and having a relatively small discharge aperture 83. Nut 81 has a sleeve 82 threaded into the upper end of bore 75.

This throttling action has been found to reduce the hum of a gear pump by increasing the suction pressure on the input side.

Referring to Fig. 1, the course of the liquid to be filtered through the housing is in at the inlets 26 or 27 through the filter unit 23 out of the bore 75 and 83 into the chamber 36 and out of the outlet 40.

Figure 11:
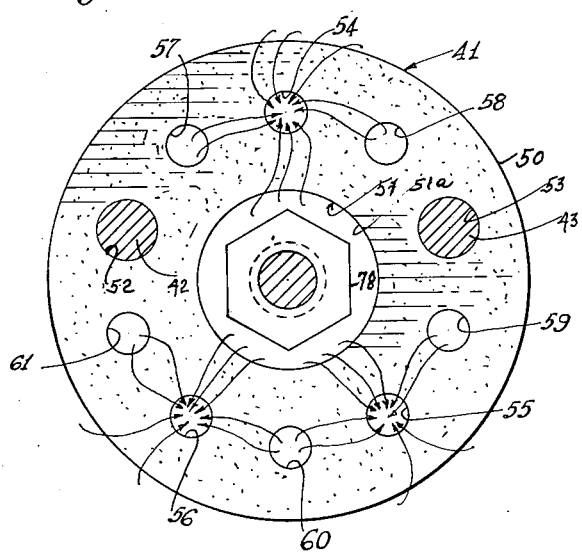
Fig. 11 is an enlarged plan view similar to Fig. 6 showing the direction of flow of the liquid to be filtered through the filter pads to the filtrate conduits.

Referring to Fig. 11, this figure illustrates the course of the liquid to be filtered through the filter pads.

As previously described, the bottom plate 47 (Fig. 8) has apertures 57—61 open. Liquid to be filtered passes upwardly through these apertures and into corresponding apertures or conduits extending through all of the filter pads 41 and alignment plates 46. From these apertures in the pad assembly the liquid to be filtered passes into the walls of the pads at the apertures mentioned, and finds its way over to the filtrate apertures 54, 55, 56.

Liquid to be filtered also surrounds the unit 23 in the chamber 25 and passes into each pad at the outer cylindrical surface 50 which becomes covered with residue. Liquid to be filtered also has access to the central bore 51 through the aperture 63 in bottom plate 47 (Fig. 8), and the liquid to be filtered passes into the pad at the inner cylindrical surface 51$^a$, again finding its way in each case to the filtrate apertures 54, 55, 56 as illustrated by arrows in Fig. 11.

It is found that substantially all of the external surface of the pads serves as a filter surface, as well as all of the inner surface 51 of the central bore, and all of the wall surfaces of the apertures 57—61 serve as filter surfaces becoming covered with residue while still passing clear liquid.

From the holes 54, 55, 56 in the top plate 44 the filtrate passes into the chamber 73 through the slots 76 to the upper end of bore 75 and out of the small aperture 83 into chamber 36.

Referring to Fig. 9, the assembly here is exactly the same as shown in Figs. 1 and 2, except the alignment plates 46 have been omitted for purposes of economy. The same filtering action is to be expected from this assembly except that the felt pads are not so perfectly aligned, as they are apt to become compressed at one side or the other of their bores 52, 53 which engage the pins 42, 43. This permits filter pads to get slightly out of alignment, presenting an irregular cylindrical surface at the outside of the filter unit due to misalignment. This may make the filter unit less saleable due to its appearance, but it is none the less effective.

Referring to Fig. 10, in this embodiment one elongated cylindrical pad 84 replaces all of the pads 41 and plates 46. In this case the pins 42, 43 may be eliminated also as there are no separate pads to be kept in alignment. Such a pad 84 may be used and punched out of a felt sheet when it is to be quite short or it may be made by felting or forming the pad in a mold, which contains pins extending axially and corresponding to all of the desired apertures 51 and 52—61.

Fig. 12 shows a modification on a reduced scale in which two pads are interposed between each pair of alignment plates, thus effecting a very good alignment with a minimum number of plates. In each of the modifications of Figs. 10 and 12, it is again desirable to include means for aligning the holes in the pad with those of the end plates, such as pins 42, 43.

It will be apparent that should the filter pads ever become so tightly clogged that they will not pass liquid, the pressure generated in the housing 35 will force the partition 70 upward against spring 24 until liquid is bypassed out of outlet 40.

The present filter units may be quickly removed and provided with new filter elements or pads, and the pads are so cheap that when they have become excessively dirty or clogged they may be thrown away. It is not necessary, however, to throw the pads away as they can be very readily cleaned by washing them in gasoline, benzene or some other suitable solvent for the residue, and then replaced on the pins 42, 43.

As the pins require larger apertures 52, 53 in the pads and plates, and as the pins are offset and not symmetrically located on the same diameter, the location of the pins permits one to assemble the pads and plates only in one way, which is the right way, with the proper apertures in alignment, not only throughout the body of the filter unit, but also at the top plate and bottom plate.

It has been found that the present filter has such a large filtering surface that it is adapted to filter a volume of liquid far in excess of that required by the usual oil burner of the nozzle type. Futhermore, the pressure differential between the inlet and outlet of the filter may be relatively small, thus reducing the power that is absorbed in filtering.

The filter assembly may be manufactured at a very low cost and it includes a minimum number of parts, and the filter units may be used for a long period of time before it is necessary to replace them, whereas the screen devices of the prior art soon became dirty, requiring considerable labor to clean them or considerably more expense to replace them.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A filter assembly comprising a supporting member said member comprising a disc having an axially extending lug, said lug being provided with a filter assembly outlet leading to the lower side of said disc, a centrally located rod threaded into said member and having a threaded member providing a retaining shoulder, a supporting plate having an aperture for said rod and engaged by said shoulder, said plate also having filtrate apertures, a lug depending from said supporting member surrounding said rod and a depending cylindrical wall carried by said supporting member, and a filter screen having an annular gasket surrounding said rod and a second annular gasket located at the edge of said screen to be clamped between said cylindrical wall and said plate when the gasket surrounding said rod is clamped between said lug and said plate.

2. A filter assembly comprising a supporting member said member comprising a disc having an axially extending lug, said lug being provided with a filter assembly outlet leading to the lower side of said disc, a centrally located rod threaded into said member and having a threaded member providing a retaining shoulder, a supporting plate having an aperture for said rod and engaged by said shoulder, said plate also having filtrate apertures, a lug depending from said supporting member surrounding said rod and a depending cylindrical wall carried by said supporting member, and a filter screen having an annular gasket surrounding said rod and a second annular gasket located at the edge of said screen to be clamped between said cylindrical wall and said plate when the gasket surrounding said rod is clamped between said lug and said plate, the said gasket comprising rings of cork shellacked to said screen and said screen comprising a closely woven cloth impregnated with an insoluble resin, while still presenting a fine mesh.

3. In a filter assembly, the combination of a housing having a cylindrical chamber provided between its ends with an inwardly extending annular shoulder, said chamber having an open end provided with a cover and means for securing the cover, a supporting partition having an annular seating surface to engage said annular shoulder, said housing having an outlet and having an inlet disposed on opposite sides of said partition, and resilient means above said partition engaged by said cover for holding said partition against said annular shoulder, said partition comprising a circular member provided with an axial hub having a discharge conduit through said hub, a depending annular flange on said partition, a centrally apertured screen engaging said depending flange and provided with an annular gasket on its lower side, a metal plate engaging said gasket, said metal plate having apertures for passing liquid, a threaded rod passing through said screen and said metal plate and threaded into said hub, a complementary threaded member on said rod and clamping said plate against said said gasket, forming annular chambers above the plate and below the screen inside the gasket and above the screen and below the partition inside said annular flange.

4. In a filter assembly, the combination of a housing having a cylindrical chamber provided between its ends with an inwardly extending annular shoulder, said chamber having an open end provided with a cover and means for securing the cover, a supporting partition having an annular seating surface to engage said annular shoulder, said housing having an outlet and having an inlet disposed on opposite sides of said partition, and resilient means above said partition engaged by said cover for holding said partition against said annular shoulder, said partition comprising a circular member provided with an axial hub having a discharge conduit through said hub, a depending annular flange on said partition, a centrally apertured screen engaging said depending flange and provided with an annular gasket on its lower side, a metal plate engaging said gasket, said metal plate having apertures for passing liquid, a threaded rod passing through said screen and said metal plate and threaded into said hub, a complementary threaded member on said rod and clamping said plate against said gasket, forming annular chambers above the plate and below the screen inside the gasket and above the screen and below the partition inside said annular flange, said gasket comprising a plurality of rings of cork shellacked to said screen, and said screen comprising a closely woven cloth impregnated with an insoluble resin, while still presenting a fine mesh.

5. In a filter assembly, the combination of a housing having a cylindrical chamber provided between its ends with an inwardly extending annular shoulder, said chamber having an open end provided with a cover and means for securing the cover, a supporting partition having an annular seating surface to engage said annular shoulder, said housing having an outlet and having an inlet disposed on opposite sides of said partition, and resilient means above said partition engaged by said cover for holding said partition against said annular shoulder, said partition comprising a circular member provided with an axial hub having a discharge conduit through said hub, a depending annular flange on said partition, a centrally apertured screen engaging said depending flange and provided with an annular gasket on its lower side, a metal plate engaging said gasket, said metal plate having apertures for passing liquid, a threaded rod passing through said screen and said metal plate and threaded into said hub, a complementary threaded member on said rod and clamping said plate against said gasket, forming annular chambers above the plate and below the screen inside the gasket and above the screen and below the partition inside said annular flange, said plate supporting a pair of metal pins riveted to said plate and extending parallel to said rod, a plurality of pads of felt, said pads having an enlarged central aperture surrounding said rod and having apertures for receiving said metal pins, and having inlet and filtrate apertures kept in alignment by said metal pins, said inlet and filtrate apertures serving for conducting liquid into the pads and for conducting filtrate out of the pads, said filtrate apertures registering with the apertures in the first-mentioned plate and said inlet apertures sealed by said first mentioned plate, and a second metal plate engaging the last pad of felt which is remote from said partition, and having apertures for passing liquid, said inlet apertures registering with the apertures in the second mentioned plate, and said filtrate apertures sealed by said second mentioned plate.

6. In a filter assembly, the combination of a housing having a cylindrical chamber provided between its ends with an inwardly extending annular shoulder, said chamber having an open end provided with a cover and means for securing the cover, a supporting partition having an annular seating surface to engage said annular shoulder, said housing having an outlet and having an inlet disposed on opposite sides of said partition, and resilient means above said partition engaged by said cover for holding said partition against said annular shoulder, said partition comprising a circular member provided with an axial hub having a discharge conduit through said hub, a depending annular flange on said partition, a centrally apertured screen engaging said depending flange and provided with an annular gasket on its lower side, a metal plate engaging said gasket, said metal plate having apertures for passing liquid, a threaded rod passing through said screen and said metal plate and threaded into said hub, a complementary threaded member on said rod and clamping said plate against said gasket, forming annular chambers above the plate and below the screen inside the gasket and above the screen and below the partition inside said annular flange, said plate supporting a pair of metal pins riveted to said plate and extending parallel to said rod, a plurality of pads of felt, said pads having an enlarged central aperture surrounding said rod and having apertures for receiving said metal pins, and having inlet and filtrate apertures kept in alignment by said metal pins, said inlet and filtrate apertures serving for conducting liquid into the pads and for conducting filtrate out of the pads, said filtrate apertures registering with the apertures in the first-mentioned plate, and said inlet apertures sealed by said first mentioned plate, and a plurality of additional sheet metal plates located between said pads and having aligned apertures with the pads, the lowermost of said metal plates being located outside of the end pad and being engaged by a spring on said rod, and threaded means on the end of the rod for compressing said spring and the last named plate being apertured for passing liquid, said inlet apertures registering with the apertures in said last named plate and said filtrate apertures being sealed by said last named plate.

WILLIAM W. HALLINAN.

REFERENCES CITED

The following references are of record in the file of this patent:

UNITED STATES PATENTS

| Number | Name | Date |
| --- | --- | --- |
| 651,901 | Torrance | June 19, 1900 |
| 680,902 | Weaver | Aug. 20, 1901 |
| 1,035,248 | Seavey | Aug. 13, 1912 |
| 1,506,967 | Bosworth | Sept. 2, 1924 |
| 2,186,440 | Williams | Jan. 9, 1940 |
| 2,196,349 | West | Apr. 9, 1940 |
| 2,301,120 | Kamrath | Nov. 3, 1942 |
| 2,331,961 | Clark | Oct. 19, 1943 |
| 2,332,535 | Ross | Oct. 26, 1943 |
| 2,389,431 | Hallinan | Nov. 20, 1945 |

FOREIGN PATENTS

| Number | Country | Date |
| --- | --- | --- |
| 107,090 | Great Britain | June 21, 1917 |